Aug. 23, 1955 J. KAUTZKY 2,715,791
ARTIFICIAL FISHING LURE
Filed June 16, 1952
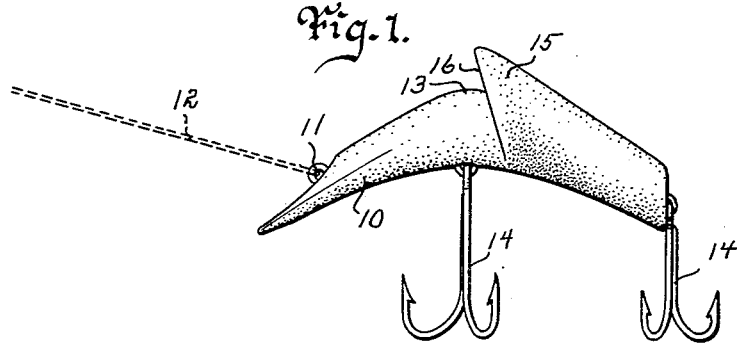
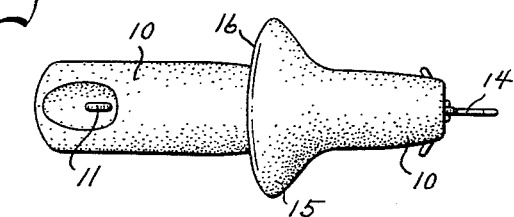
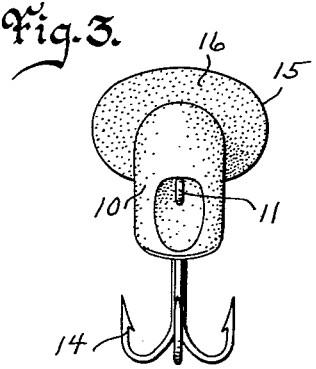
Inventor
Joe Kautzky
by Talbert Dick & Adler
Attorneys
Witness
Edward P. Seeley

United States Patent Office

2,715,791

ARTIFICIAL FISHING LURE

Joe Kautzky, Fort Dodge, Iowa

Application June 16, 1952, Serial No. 293,754

1 Claim. (Cl. 43—42.48)

This invention relates to fishing lures and particularly to casting or trolling baits usually called "fishing plugs."

While my invention may be used successfully on various types of plugs (and which will be herein later discussed), it is particularly adapted for use on plugs internationally known by fishermen under the trade name "Lazy Ike." Such plugs are inverted U-shape when viewed from the side, and have a relatively flat forward end as shown in the drawings. These lures, because of their shape, when drawn through the water have life like swimming characteristics to effectively simulate a live minnow swimming in the water. While this action is highly necessary and desirable, the shape of these lures produces the undesirable tendency to dive from the water surface when drawn through the water. Therefore, one of the objects of my invention is to provide a means for such plugs that will maintain them at water surface level while being reeled in without adversely effecting their normal lateral movements.

A further object of my invention is to provide a fishing plug lure that is capable of maximum water turbulence thereby causing great commotion and tremendous water distortion for attracting the attention of game fish in the vicinity.

A still further object is to provide a fishing bait that is capable of being operated to produce fish attracting sounds and a profusion of air bubbles.

A still further object of my invention is to provide a fishing plug that is capable of being cast accurately and to great distances.

A still further object of my invention is to provide a fishing plug that when cast, offers a minimum of wind resistance and enters the water easily and smoothly.

A still further object of this invention is to provide a fishing plug that is durable in use and refined in appearance.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a side view of my fishing lure ready for use,

Fig. 2 is a top plan view of my lure and more fully illustrates its construction, and Fig. 3 is a front end view of the lure.

In these drawings I have used the numeral 10 to designate the body of the fish plug which is elongated and has an eyelet 11 at its forward end. The numeral 12 designates a fishline or the like secured to the eyelet 11. This elongated body 10 is arched when viewed from the side as shown in Fig. 1, with its hump or center bend 13 substantially evenly spaced between its two ends. The numeral 14 designates hooks hingedly secured to the center bottom and extreme back of the portion 10. The front end portion of this plug is horizontally wedge-shaped or flat as shown in Fig. 1 and Fig. 2.

The structure of the plug thus far disclosed is that of a "Lazy Ike" type of plug and one that normally floats at the surface of the water when not being drawn through the water.

My invention resides in the forming of a flared flange portion 15 which embraces the center portion of the lure at approximately its center hump portion 13. The leading side of this portion 15 is substantially flat and extends outwardly from the sides and back top of the body 10 as shown in Fig. 3. This flat portion of the flared flange is designated by the numeral 16 and extends forwardly and upwardly relative to the longitudinal center line of the plug. The rear side of this portion 15 flares inwardly and toward the main body of the plug to terminate some distance from the rear end of the body of the plug as shown in Fig. 2.

When the lure is drawn through the water, the downwardly extending metal hooks 14 will hold the body of the lure in its proper position as shown in Fig. 1. When the lure shown in the drawings is drawn through the water, the flange will cause the lure to ride at the water surface and thereby counteract any tendency of the plug to dive due to its shape or flat forward end. This means that regardless of its speed relative to the water, it will ride at the water surface and due to conflicting forces, the plug will have extreme action characteristics.

The normal procedure in fishing with such a plug is that after it has been cast, it is permitted to float at the water surface, and is then reeled in. As before noted, the shaped characteristics of the plug will cause it to dive, but the moment the flange portion engages the water resistance, due to its angularity to the longitudinal axis of the plug, said flange portion will cause the plug to remain at the water surface. By maintaining the plug at the water surface, however, the action of the lure will not be impaired and as a matter of fact, the flange portion increases the water disturbance at the surface and this "boiling" or water commotion will be extreme in character, thereby attracting any game fish in the vicinity of the plug. This action of the plug when drawn through the water will be of an explosive nature and by proper manipulation by the fisherman, will not only produce great water agitation, but both bubbles and noises can be created to further attract the game fish. Furthermore, the plug will have unique minnow-like swimming action at the surface of the water during its movement through the water. By inwardly flaring the flange portion at its trailing side, highly desirable casting results are obtained. The reason for this is that when a plug is cast, its rear end is the end that passes through the air first and in such condition enters the water. Therefore, by the rear side of the flange being flared, it will cut through the air during casting and offer a minimum of air resistance. This not only means that the plug is capable of extreme distance casting, but travels in a true course and not erratic as in many types of plugs. Therefore, my plug is not only capable of maximum distance in casting, but also permits most accurate casting. Upon entering the water at the cast, the plug by entering the water rearwardly will do so smoothly and with a minimum amount of splash. While I have described my invention as particularly adapted for plug casting, it is obvious that the lure may be made in different shapes and sizes not only for plug casting, but for fly rod and spin rod useage.

As herebefore noted, I have described my invention as particularly desirable on "Lazy Ike" lures, but it is also excellent for use on "sinker" type plugs. In this latter type of plug, the plug due to its weight relative to the density of the water, will sink below the surface of the water. With my flange thereon, the plug will tend to rise to the surface when reeled in or when used in trolling. Upon reaching the surface of the water, the flange will operate the same as other plugs, not only holding the plug at the water surface, but it is also capable of scooping air from the surface of the water, forcing the same below the surface in the form of bubbles and in general producing extreme water turbulence. While I have described the location of the flange as centrally located, some types of lures may require the flange to be located forward of the center length of the plug or to the rear of the plug center length.

While I have described the flange portion and shown the same integrally formed with the body of the lure, it is obvious that this flange portion may be made separately therefrom and attached to the body of the lure by any suitable means.

Some changes may be made in the construction and arrangement of my artificial fishing lure without departing from the real spirit and purpose of my invention, and it is my intention to cover by my claim, any modified forms of structure or use of mechanical equivalents which may be reasonably included within its scope.

I claim:

In a fish lure, an elongated arched body having a center hump portion, at least one fish hook on said arched body, said body portion having a flared flange rearwardly of said hump and extending upwardly and forwardly relative to the longitudinal center line of the body portion, said flange portion being outwardly extended from the body portion only at the sides and top of said arched body.

References Cited in the file of this patent

UNITED STATES PATENTS

| | | | |
|---|---|---|---|
| D. 151,002 | Raschke | Sept. 14, | 1908 |
| 696,433 | Heddon | Apr. 1, | 1902 |
| 2,270,488 | Withey | Jan. 20, | 1942 |
| 2,494,948 | LaMontagne | Jan. 17, | 1950 |
| 2,526,115 | Boyette | Oct. 17, | 1950 |
| 2,603,903 | Brown | July 22, | 1952 |